Oct. 10, 1933.   J. ROBINSON   1,930,183
AUTOMATIC TRAIN PIPE CONNECTER
Original Filed Feb. 9, 1931   2 Sheets-Sheet 1
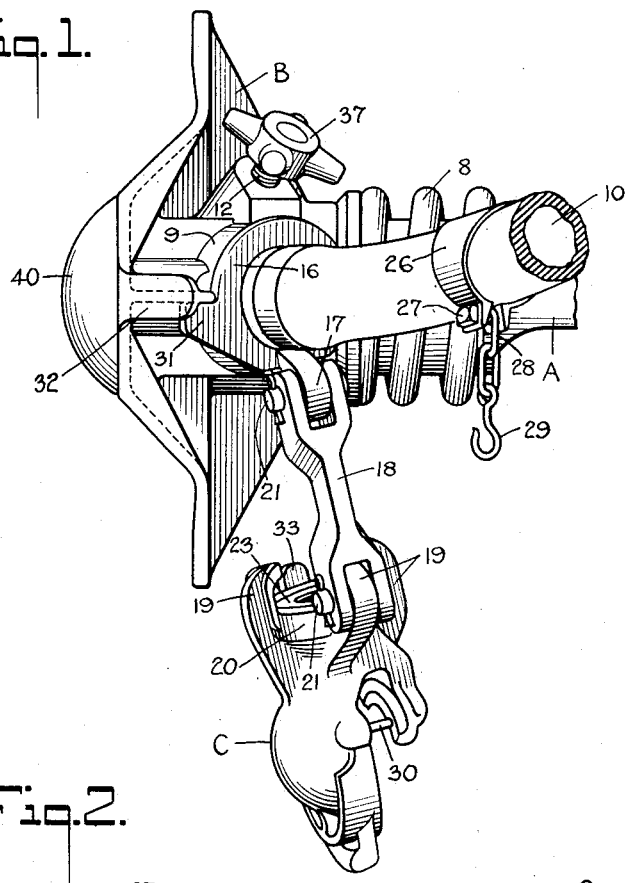
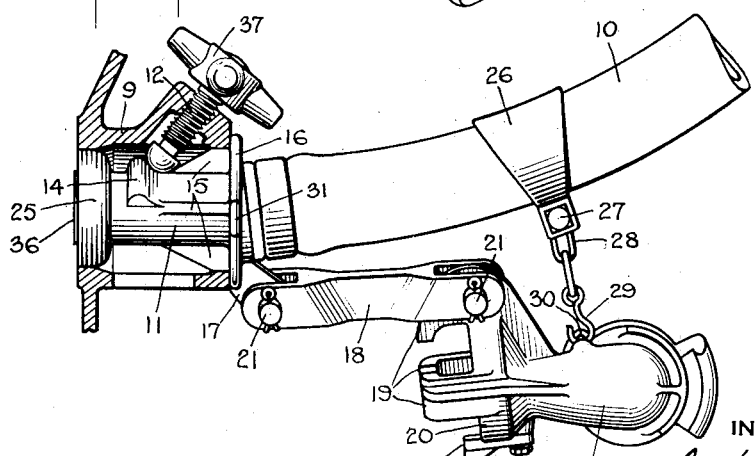
INVENTOR
Joseph Robinson
BY
Watson, Coit, Morse & Grindle
ATTORNEYS

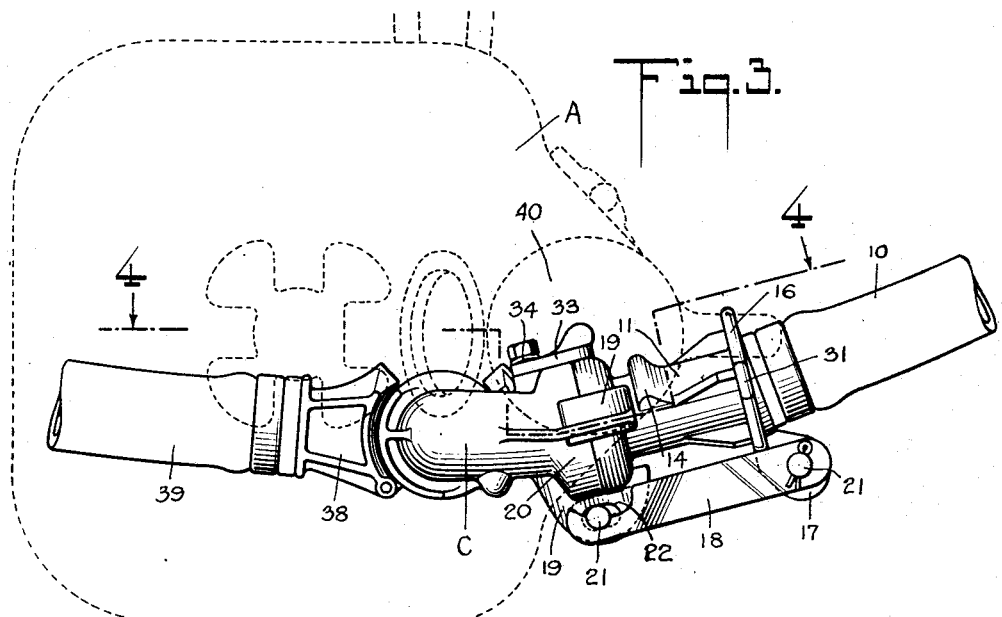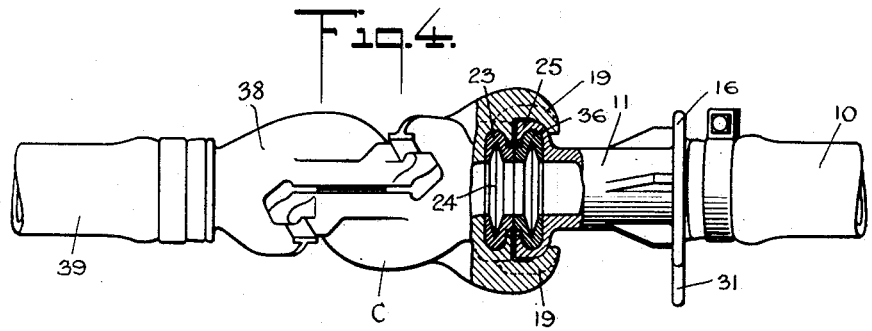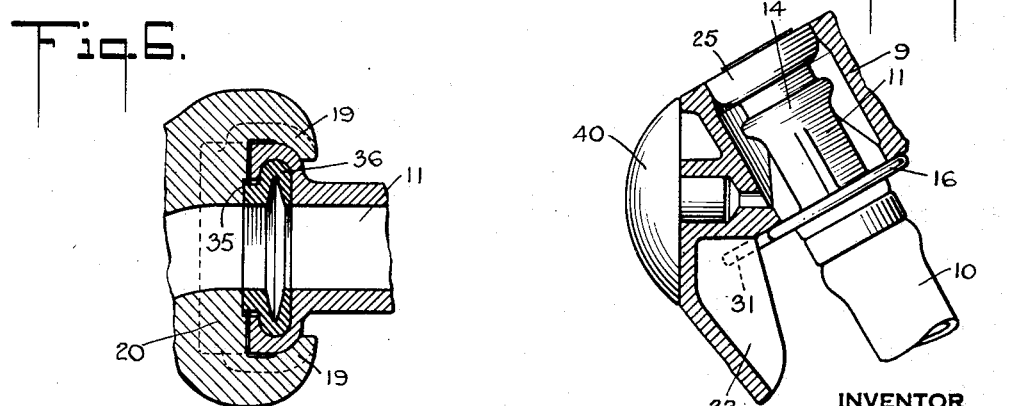

Patented Oct. 10, 1933

1,930,183

UNITED STATES PATENT OFFICE 1,930,183

AUTOMATIC TRAIN PIPE CONNECTER

Joseph Robinson, New York, N. Y.

Application February 9, 1931, Serial No. 514,600
Renewed February 28, 1933

12 Claims. (Cl. 285—58)

My invention relates to automatic train pipe connecters, and more particularly to devices for connecting a car equipped with an automatic connecter to one not so equipped. My improvement is adapted for use with any form of automatic connecter but I show it as applied to a connecter having a coupling head through which the train line air is conveyed at an angle to the longitudinal axis of the head. This construction of connecter and head is fully illustrated and described in my copending application serial #502,479 filed December 15th, 1930.

In the drawings Figure 1 is a side elevation showing my improved interchange in one of its non-service positions;

Figure 2 is a section through the housing 9 of the connecter head looking at it from the front, and showing my improvement in front elevation;

Figure 3 is a front elevation of my improved interchange coupled to the hose of an unequipped car. In this view the coupling head is shown in dotted lines, and a part of the link 18 is broken away to more clearly illustrate the elongated slot 22 hereinafter described;

Figure 4 is a sectional plan view taken on the line 4—4 of Figure 3;

Figure 5 is a sectional plan view through the housing 9, and a part of the horn 40 of the coupling head, showing the relation between the projection 31 of the conduit 11 and the pilot or guide lug 32 of the head when the connecter hose is in place; and Figure 6 is an enlarged sectional view through the rear end of the interchange head or dummy and the forward end of the conduit 11, showing the automatic air actuated locking means hereinafter described.

My improved interchange may, of course, be used with any automatic connecter. I show it as applied to a connecter having a coupling head of the general pin and funnel or horn and ring type and in which the air is conveyed through the head at an angle to the longitudinal direction of the connecter. A suitable support A, including a spring 8, yieldingly suspends the coupling head B from a fixed part of the car in any desired manner. The head is provided with a barrel or housing 9 disposed obliquely to the longitudinal direction of the connecter. The usual train pipe hose 10 leads from the train pipe of the car downwardly to the automatic connecter in the usual manner, and is provided at its lower end with a suitable hollow conduit 11 which normally rests within the housing 9. A threaded plunger 12, engaging a seat or shoulder 14 on the conduit, removably secures the conduit in the housing. Lugs 15 are provided to position the conduit 11 in the housing 9, and an annular collar or shoulder 16 is formed on the conduit to engage the rear side of the housing to limit the forward movement of the conduit therein, as shown particularly in Figures 2 and 5. A suitable lug 17, formed integrally with the conduit or otherwise suitably connected thereto, extends away from the conduit at a point preferably outside of the barrel or housing 9 and to one side of the hose 10.

A link 18 forked at either end or otherwise arranged to engage the lug 17 is pivotally and slidingly connected to the lug. One end of the link spans one of the three aligning jaws or interlocking dogs 19, which are formed at the face or rear end 20 of my improved interchange head or dummy C, and has pivotal and sliding relation thereto by reason of the pins 21, and the elongated slot 22 shown in Figure 3. The interchange dummy has, of course, the coupling contour or face of the conventional hand operated hose coupling now generally in use on railway cars. The base 20 of the interchange is provided with an interior annular seat in which is mounted an air expanded gasket 23 having an interior annular groove 24. This seat and gasket are duplicates of the seat and gasket in the forward end 25 of the conduit 11—see particularly Figure 4. To support my improved interchange so that it will rest as far as possible above the railroad track when not in the service position, I mount a suitable wide flexible band 26 around the hose 10 as by means of a bolt 27. This bolt passes through the upper link of a chain 28, or other form of connection, in the lower end of which chain is mounted a suitable hook 29 that is adapted to engage the stop pin 30 of the interchange head C to support the interchange—see particularly Figure 2. As the interchange may occasionally be left in the hanging position shown in Figure 1, the lug 17 of the conduit 11 is positioned at an angle to the vertical in order to throw the interchange dummy C a substantial distance rearward of the meeting face of the coupling head B and hold it there, see Figure 1. That the interchange will always be held in this position when the conduit 11 is assembled into the connecter head, is assured by reason of the laterally extending projection or lug 31, formed integrally with the annular shoulder 16 or otherwise secured to the conduit, and projecting under the guide pin or pilot 32 of the coupling head B. It will be evident that the conduit cannot be inserted into the housing 9 except so as to hold the interchange C away from the face of the coupling head when it is hanging—see Figures 1 and 5. While the weight of the hose 10 and the fitting 11 tends always to hold the latter in the interlocked position shown in Figure 3, I preferably provide a suitable latch 33 which is pivoted to the interchange head C as at 34 and may be rotated into and out of the path. The conduit 11 travels when being assembled into and removed from the jaws 19 of the interchange dummy C. The joint between the interchange C and the conduit 11 is, of course, sealed by the fluid pressure entering the gaskets 23 and 36 and expanding them against each other.

A modified form of lock for securing the conduit 11 to the interchange dummy is shown in Figure 6. It consists in eliminating the gasket 23 from the base 20 of the dummy, and providing an annular groove 35 in such face. The depth of the groove is relatively slight, and its diameter somewhat in excess of the diameter of the gasket in the conduit 11. When air is admitted to the conduit the face of its gasket 36 is expanded into the groove 35, thus automatically positively locking the conduit and dummy together. When the air pressure is removed the gasket contracts, drawing its face out of the groove 35 and unlocking the parts.

When it is desired to place a car equipped with a connecter that has my improved interchange, into communication with the hose of a car not so equipped, the plunger 12 is retracted by rotating it through the medium of the wing nut 37 until the conduit 11 is fully released. The conduit is then removed rearwardly from the housing 9, the interchange dummy C released from the hook 29 and swung across the front face of the conduit 11 into the service position shown in Figure 3. During this operation the front end of the conduit passes downwardly between the jaws 19. The latch 33 is then swung across the front end 25 of the conduit thus positively locking the conduit and the dummy together. The connecter hose 10 is then, in the usual manner, coupled into the conventional form of hand operated hose coupling 38 carried by the hose 39 of the unequipped car.

My improved interchange has the important advantage that it does not complicate the automatic connecter air line in any way—leaves this air line as free from complication as if interchange had not been intended. It provides an interchange that is always with the connecter ready for immediate use, and one that may, by removing the pin 21, be easily discarded when the transition period is over without leaving any appreciable trace in the automatic connecter that the interchange had existed. Anchored to the connecter in the manner arranged, the interchange cannot be accidentally left in position across the face of the coupling head B to be damaged when opposing connecters attempt to couple.

It will be understood of course that the length of the interchange dummy C should be such as to enable it to readily connect the hose 10 into interchange communication with the hose of the unequipped car, with sufficient play in the two hose to take care of the running in and out of the cars in service. Preferably the interchange dummy, when coupled into the hose of the unequipped car, should hang either across the face of the horn or pin 40 of the coupling head or beneath the same. It will also be appreciated from the herein disclosure of my invention that the dummy may be held up away from the railroad track by supporting it on another member of the connecter than the hose 10, as for instance the supporting mechanism A.

What I claim is:

1. In an automatic train pipe connecter, the combination with a coupling head, of a fluid conduit adapted to be removably mounted in said head, said conduit having a front face, and means independent of said head pivotally connected with said conduit and adapted to be swung across the front face of the conduit when the conduit is removed from the head, whereby said conduit may be connected into interchange communication with the train pipe hose of a car not equipped with said automatic connecter.

2. In an automatic train pipe connecter, the combination with a coupling head, of a conduit adapted to be removably mounted therein, said conduit having a front face disposed in the vertical plane when in said head, and means independent of said head for connecting said conduit into interchange communication with the train pipe hose of a car not equipped with said automatic connecter, said means including a device pivotally connected with said conduit and having the coupling contour of a conventional form of hand operated hose coupling and arranged to be swung across said front face of the conduit into air tight secure engagement therewith when said conduit is removed from the head.

3. In an automatic train pipe connecter, the combination with a coupling head, of a fluid conduit adapted to be removably mounted in said head with its front face disposed obliquely to the longitudinal direction of the connecter, and means independent of said head for connecting said conduit into interchange communication with the train pipe hose of a car not equipped with the connecter, said means including a device having the coupling contour of a conventional type of hand operated hose coupling pivotally connected with said conduit and adapted to be swung across the face of the conduit into interlocked air tight engagement therewith when the conduit is removed from said coupling head.

4. In an automatic train pipe connecter, the combination with a coupling head, of a fluid conduit adapted to be removably mounted in the head and attached at its rear end to the train pipe hose of the car equipped with said connecter and carrying at its front end a gasket, of means for connecting said hose into communication with the hose of a car not equipped with the connecter, said means including a device having the coupling contour of a conventional form of hand operated hose coupling, a gasket in the rear face of said device, a plurality of spaced lugs adjacent said face, and pivot means connecting said device with said conduit so that the device may be swung across the forward end of the conduit to bring said lugs into interlocked relation thereto and said gaskets into aligned and air tight relation one to the other, when said conduit is removed from said coupling head.

5. In an automatic train pipe connecter, the combination with a coupling head, of a fluid conduit adapted to be removably mounted in the head and attached at its rear end to the train pipe hose of the car equipped with said connecter, and means for connecting said hose into communication with the hose of a car not equipped with the connecter, said means including a device having the coupling contour of a conventional form of hand operated hose coupling, a plurality of spaced lugs adjacent said rear face of said device, pivot means connecting the device with said conduit whereby the device may, when removed from said coupling head, be swung across the forward end of said conduit to bring said lugs into interlocked relation to said device, and a pair of gaskets mounted one each in the adjoining ends of said conduit and said device and adapted to be expanded by the fluid pressure to seal the joint and increase the rigidity of the interlocked relation between said conduit and said device.

6. In an automatic train pipe connecter, the combination with a coupling head, of a fluid conduit adapted to be removably mounted in the head and attached at its rear end to the train pipe hose of the car equipped with said connecter, and means for connecting said hose into communication with the hose of a car not equipped with the connecter, said means including a device having the coupling countour of a conventional form of hand operated hose coupling, pivotal means connecting the device to said conduit whereby the device may, when removed from said coupling head, be swung across the forward end of the conduit and into air tight relation thereto, and a latch for positively locking the conduit and said device together.

7. In an automatic train pipe connecter, the combination with a coupling head, of a fluid conduit adapted to be removably mounted in said head with its front face disposed obliquely to the longitudinal direction of the connecter, and means for connecting said conduit into interchange communication with the train pipe hose of a car not equipped with the connecter, said means including a device having the coupling contour of a conventional type of hand operated hose coupling pivotally connected with said conduit and adapted to be swung across the face of the conduit into interlocked air tight engagement therewith when the conduit is removed from said coupling head, and cooperating means on said device and said hose, means for supporting said device in approximately a horizontal position at one side of the hose when the device is out of the service position.

8. In an automatic train pipe connecter, the combination with a coupling head, of a fluid conduit adapted to be removably mounted in said head with its front face disposed obliquely to the longitudinal direction of the connecter, and means for connecting said conduit into interchange communication with the train pipe hose of a car not equipped with the connecter, said means including a device having the coupling contour of a conventional type of hand operated hose coupling pivotally connected with said conduit and adapted to be swung across the face of the conduit into interlocked air tight engagement therewith when the conduit is removed from said coupling head, and cooperating means on said conduit and said coupling head for preventing incorrect assembly of the conduit and said device with respect to said coupling head.

9. In an automatic train pipe connecter, the combination with a coupling head, of a fluid conduit adapted to be removably mounted in said head with its front face disposed obliquely to the longitudinal direction of the connecter, and means for connecting said conduit into interchange communication with the train pipe hose of a car not equipped with the connecter, said means including a device having the coupling contour of a conventional type of hand operated hose coupling pivotally connected with said conduit and adapted to be swung across the face of the conduit into interlocked air tight engagement therewith when the conduit is removed from said coupling head, and a projection extending laterally away from a side of said conduit into engagement with a portion of said coupling head to prevent said interchange getting into the plane of the coupling face of said head while said conduit is assembled or is being assembled in said head.

10. Means for connecting the train pipe hose of a car having an automatic connecter head with the hose of a car which is not so equipped, said means comprising a conduit connected to said hose, a device pivotally connected with said conduit and arranged to be swung into position in line with said conduit, cooperating means on said device and said conduit for locking the former to the latter, said device having a part provided with the contour of an ordinary hand hose coupling which is adapted to be connected to the hose of the unequipped car.

11. Means for connecting the train pipe hose of a car having an automatic connecter head thereon with the hose of an adjacent car provided with an ordinary hand hose coupling, said means comprising a conduit secured to the hose of the equipped car, said conduit having a face thereon, an interchange device pivotally connected with said conduit, said device having a face adapted to be positioned against said face on the conduit, cooperating means on said device and conduit for locking the parts together, said device also having a part provided with the contour of an ordinary hand hose coupling which is adapted to be connected to the hand hose coupling on the unequipped car.

12. In an automatic train pipe connecter, the combination with a coupling head, of a fluid conduit adapted to be removably mounted in the head, an interchange device pivotally connected with said conduit, cooperating means on said device and said conduit for locking said parts together when the conduit is removed from the head, said device having a portion provided with the contour of an ordinary hand hose coupling.

JOSEPH ROBINSON.